Aug. 2, 1960  P. HOPPE  2,947,307
PLASTIC FOAM SPLINT
Filed May 20, 1955

INVENTOR.
PETER HOPPE
BY Elmer P. Rucker

ATTORNEY

United States Patent Office 2,947,307
Patented Aug. 2, 1960

2,947,307

PLASTIC FOAM SPLINT

Peter Hoppe, Troisdorf, Germany, assignor, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware Filed May 20, 1955, Ser. No. 509,983

2 Claims. (Cl. 128—90)

This invention relates to a process for producing a splint for supporting and securing diseased and injured limbs.

In order to secure and support an injured limb, use is made of a plaster splint which, as is known, is made of calcined plaster of Paris, water and cloth bandages. It has been found that by using materials which are foamable at normal temperature, it is possible to produce splints for supporting and securing diseased and injured limbs more quickly than is possible when using plaster of Paris splints. As foamable materials it is advantageous to use mixtures of hydroxyl polyesters and diisocyanates which produce polyurethane foams having an elastic rubber-like consistency. As compared with plaster of Paris splints, the splints made from such foamable materials have the advantage of being lighter in weight and consequently more comfortable to the person wearing them.

There are two preferred methods of producing a splint in accordance with the invention and these are illustrated diagrammatically in the accompanying drawing in Figures 1a and 1b, and Figures 2a and 2b.

Figure 1A:
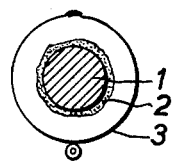
Figure 1B:
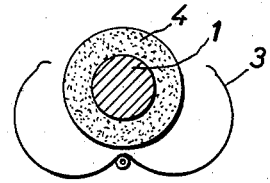

Referring to Figure 1a of the drawing, a troweling mass 2 capable of foaming at normal temperature is applied to the limb 1 and a mold 3 consisting of wood, metal or plastic is positioned around the limb. The foaming process is spontaneous and takes 12 to 15 minutes; when this process is complete, the mold 3 is removed again, as illustrated in Figure 1b, so that the limb 1 is enclosed in a sheathing 4 of the foamed material, which supports and secures the injured limb despite the fact that the sheath is very light in weight.

Figure 2A:
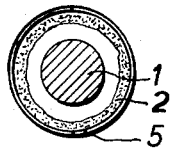
Figure 2B:
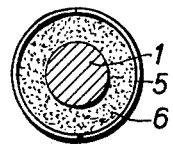

Referring to Figure 2a of the drawing, a troweling mass 2 which is foamable at normal temperature is applied to the inside of a thin-walled shell 5 corresponding to the shape of the limb 1 which is to be supported, the shell 5 is placed around the limb 1 and the mass 2 is foamed. The foamed mass 6 fills the space between the shell 5 and the limb 1, so that the latter is held as shown in Figure 2b. In this manner, it is also possible to form a prothesis socket in which the stump of a limb can be given a support conforming exactly to its shape, since the foamable mass encloses the stump with all its cavities and irregularities. Sockets which offer such complete support to the stump cannot be obtained by hand.

A number of materials with a bulk density of 100 to 300 kg./m.³ are available for the production of the outer shell, which has a wall thickness of preferably 5 to 10 mm. Examples of these materials are polyvinyl chloride, acetyl cellulose, butadiene polymers, polystyrene, phenol resin products and polyurethanes.

The outer shell can also consist of fibrous materials, such as wood, peat or straw. The fibrous materials can be shaped to form the shells necessary for carrying out the process of the invention with or without the use of synthetic binding agents.

The shells necessary for carrying out the process of the invention can be stocked in different standard sizes for legs, arms, thighs and other parts.

The foamable mixtures used in the process of the invention consist preferably of a branched polyester containing hydroxyl groups and having a hydroxyl number of 80–450 and an acid number of 2–40, and a diisocyanate which is preferably 1,2,4-toluylene diisocyanate, 1,2,6-toluylene diisocyanate or a technical mixture thereof.

Dihydric or polyhydric alcohols, for example ethylene glycol, propylene glycol, butylene glycol, hexanediol, hexanetrial, glycerol and trimethylol propane, are suitable for the production of the polyesters, while adipic acid or phthalic acid, inter alia, are used as dicarboxylic acids. By varying the proportions of a mixture of dihydric and polyhydric components it is readily possible to produce polyesters with a varying degree of branching. The esterification is carried out by thermal condensation at 150°–220° C. and is stopped upon reaching an acid number of about 2–40.

During the reaction of the polyester with the diisocyanate about 0.5–3% of water is added for the foaming. Additives, e.g. wood-dust or aluminium powder can be admixed with the synthetically obtained foaming material prior to working up the latter. The additives may contain enough water so it would not be necessary to add water as such.

*Example 1*

A foamable troweling mass adapted to produce a supporting splint is obtained from the following components:

50 parts of the polyester prepared from 2.5 mols of adipic acid, 0.5 mol of phthalic acid and 4 mols of hexanetriol, 50 parts of a polyester prepared from 3 mols of adipic acid, 3 mols of butylene glycol and 2 mols of methylol propane, and 40 parts of toluylene diisocyanate.

These components are intimately mixed and the mixture is cooled to slow down the reaction. 100 parts of wood-dust containing about 10% of water are incorporated with the mixture which has a low viscosity. The mixture is then applied by troweling to the limb to be supported or to the stump, which has previously been coated with a fat and covered with a cloth bandage to secure an isolation against the heat evolved during the foaming process. The outer shape of the splint or bandage can be defined by sheet metal shells, or by wrapping up in cloth the stump covered with the troweling mass as soon as the foaming process is half-finished.

*Example 2*

100 parts of an isocyanate-modified polyester prepared from 100 parts of an adipic acid-diethylene glycol polyester having an OH number of 55 and an acid number of 1.5 and 14 parts of hexamethylene diisocyanate are well homogenized with 150 parts of wood-dust containing about 10% of water. The mixture is used to give a support to the stump of an upper thigh in a prothesis socket.

The troweling mass which is caused to foam by the moisture content of the wood-dust at room temperature is placed on the inside of the socket. The foam which retains its resiliency covers the stump. After about 15 minutes the stump can be removed from the socket.

What is claimed is:

1. As a new article of manufacture, a polyurethane foam splint prepared by placing a mixture of partially reacted liquid ingredients adapted to form a substantially rigid polyurethane foam about a limb and maintaining said mixture about the limb until a solid substantially rigid polyurethane foam is obtained.

2. The article of claim 1 wherein said liquid ingredients include hexamethylene diisocyanate.

References Cited in the file of this patent

UNITED STATES PATENTS

| 221,569 | Johnson | Nov. 11, 1879 |
| 366,120 | Lee | July 5, 1887 |
| 1,335,475 | Bergman | Mar. 30, 1920 |
| 2,577,279 | Simon | Dec. 4, 1951 |
| 2,577,280 | Simon | Dec. 4, 1951 |
| 2,650,212 | Windemuth | Aug. 25, 1953 |

OTHER REFERENCES

German Plastics Practice, De Bell et al. (1946), pp. 300–301, 310–316 and 463–465, relied on. (Copy in Div. 50.)

"Plastic Splints and Appliances in Orthopaedic Surgery," Herschell et al., The Journal of Bone and Joint Surgery, volume 30B, No. 2, May 1948, pp. 298–308.